United States Patent [19]
Baltz et al.

[11] Patent Number: 4,839,888
[45] Date of Patent: Jun. 13, 1989

[54] DIGITAL TIME-DIVISION MULTIPLEX SWITCH-BASED TELEPHONE SUBSCRIBER CONNECTION SYSTEM

[75] Inventors: Rainier Baltz, Lingolsheim; Jean-Claude Fuhrer, Lipsheim, both of France

[73] Assignee: La Telephone Industrielle et Commerciale Telic Alcatel, Cedex, France

[21] Appl. No.: 71,955

[22] Filed: Jul. 10, 1987

[30] Foreign Application Priority Data

Jul. 10, 1986 [FR] France ................ 86 10094

[51] Int. Cl.⁴ ............................................ H04Q 11/04
[52] U.S. Cl. ................................. 370/68.1; 370/58
[58] Field of Search .................... 370/58, 68.1, 62

[56] References Cited
U.S. PATENT DOCUMENTS 3,689,701 9/1972 Bosonnet et al. .............. 370/68.1
4,327,436 4/1982 Ohara et al. ..................... 370/58
4,491,944 1/1985 Caizergues et al. ............. 370/58

Primary Examiner—Douglas W. Olms
Assistant Examiner—Melvin Marcelo
Attorney, Agent, or Firm—Sughrue, Mion, Zinn, Macpeak & Seas

[57] ABSTRACT

Telephone subscriber connection system based on a ditital time-division switch. System of connecting telephone subscribers whose devices (2) are connected to junctors (6, 7) of a digital time-division switch (1) controlled by a central processor (5). Each junctor is identically connected to the switching network (4) of the switch by the same number of channels of a shared time-division multiplex link (LM0), all information concerning a junctor passing on these channels between the junctor and either another junctor or the central processor. The latter has direct access to the switching memory (17) of the switching network enabling it to read or write there directly. Requests addressed to the central processor (5) from the devices (2) connected to a junctor (6) are directly transmitted by this means to said central processor.

9 Claims, 4 Drawing Sheets

DIGITAL TIME-DIVISION MULTIPLEX SWITCH-BASED TELEPHONE SUBSCRIBER CONNECTION SYSTEM

BACKGROUND OF THE INVENTION

The present invention has for its subject a system of connecting telephone subscribers, notably a private type system, based on a digital time-division multiplex switch.

The introduction of increasing numbers of telecommunication devices adapted to be connected to the lines of a telephone switch in order to provide for communication of information in highly diversified forms employing significantly different procedures implies the provision of switches that are both easily adaptable to the needs of users and also able to ensure a uniformization of information needed for it to be switched by the switching network of the switch through which they pass and possibly for transmission via communication networks, in particular the public telephone network.

This implies in the first place that the information transmitted by the telecommunication devices of users directly connected to a switch and by communication networks to which the switch is connected, which are provided in forms and with procedures specifically adapted to these devices or equipment, are formatted at the level of the junctors which receive them in the switch so as to be presented in a form acceptable by the switching network of the switch.

This implies secondly that signalling received in possibly extremely diverse forms from the devices and communication network via the junctors of the switch so that the latter can act on them are also formatted at these junctors so that they can be easily acted on by the internal control system of said switch.

A solution employed in large switches with a control system comprising a number of processors consists in assigning processors to the various junctors and to have the junctor processors communicate with those of the control system through the intermediary of one or more connecting networks internal to the switch with information exchanged in a way that is standardized for each connecting network.

A solution of this kind has the disadvantage that it is complicated and too costly for the smallest capacity switches, where the volume of traffic to handle is less and in particular does not justify the use of a large number of processors.

SUMMARY OF THE INVENTION

The present invention therefore proposes a system of connecting telephone subscribers, in particular a system of the private type, based on a digital time-division multiplex switch which is controlled by a central processor, which is synchronized by a central clock, which comprises a switching network consisting of a time-division switching matrix and junctors connected to the switching network by time-division multiplex links and either to telecommunication devices, possibly of a diverse kind, by which the subscribers are connected to the switch via appropriate lines to communicate with each other, or to other switches, the junctors being specifically adapted according to the telecommunications devices or switch equipment to which they are connected.

According to one characteristic of the invention all the various junctors are connected to the switching network in the same way, each having the same number of time-division channels on one of the time-division multiplex links carrying all of the information concerning it in such a way that this information is systematically switched to another junctor or to the central processor, the latter having direct access to the switching memory which it can read and write directly, and at least one access via a universal asynchronous receiver-transmitter circuit connected in the same way as a junctor to a time-division multiplex link via a link circuit handling bidirectional conversion and transmission of signals between the time-division multiplex link and the universal asynchronous receiver-transmitter circuit concerned.

BRIEF DESCRIPTION OF THE DRAWINGS

The invention, its characteristics and its advantages are specified in the following description with reference to the figures listed below.

DETAILED DESCRIPTION OF THE INVENTION

Figure 1:
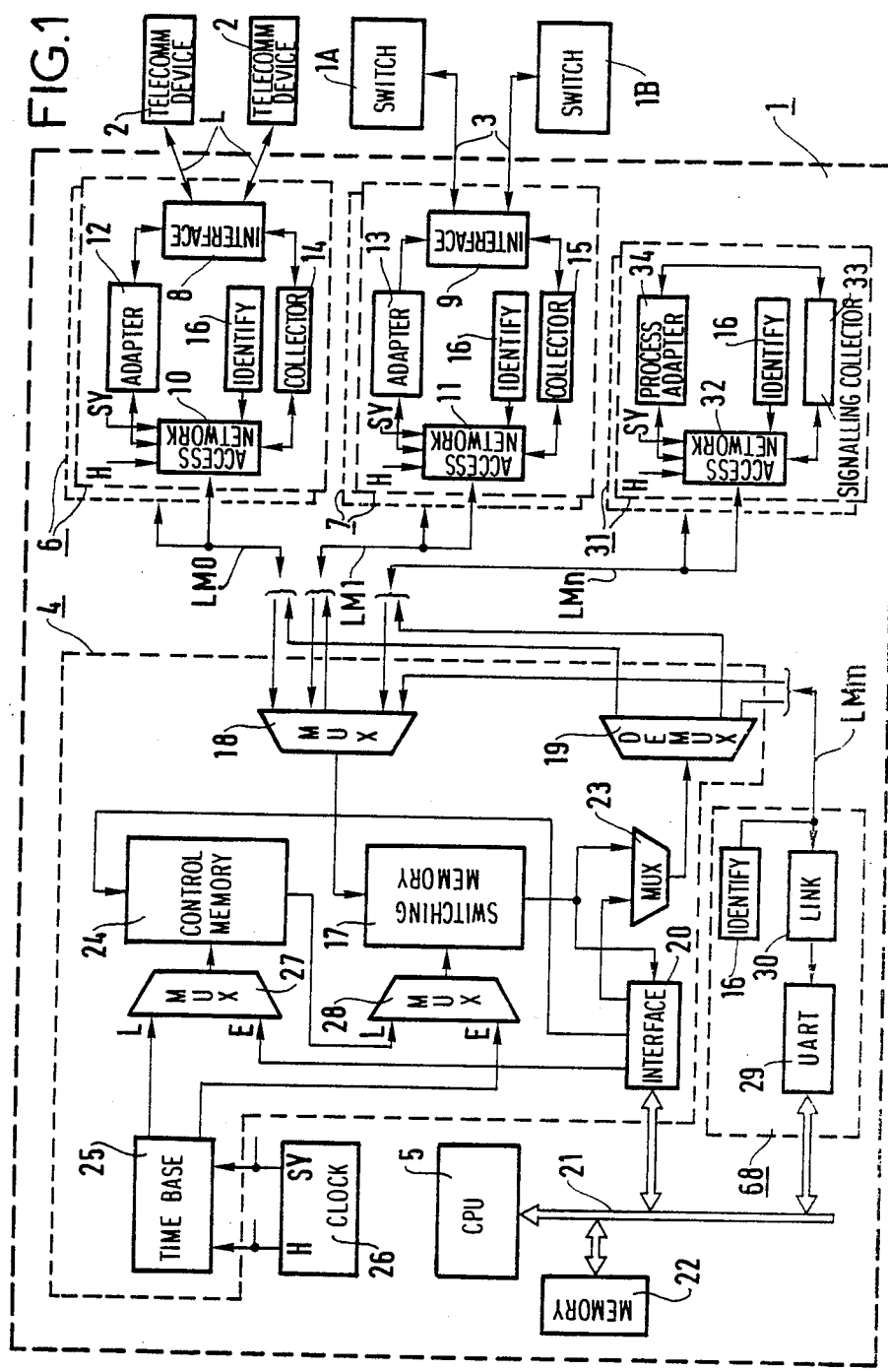
FIG. 1 shows the block diagram of a connection system in accordance with the invention.

The telephone subscriber connection digital time-division multiplex system shown in FIG. 1 is adapted to permit connection of various telecommunication devices 2 for the purposes of communication with identical or compatible devices through the intermediary of a switch 1, possibly via telephone links 3 connecting this switch to other switches 1A, 1B of the same communication network.

The exchange 1 is of the type with a digital time-division switching network 4; it is under the control of a central processor 5 responsible in particular for setting up calls between telecommunication devices 1 through the intermediary of the switching network 4.

As already mentioned, the telecommunication devices 2 may differ considerably, their common characteristic being that they are adapted to enable exchange of signals corresponding to speech or data with identical or compatible devices through a telephone type switching network.

The telecommunication devices 2 are, for example, ordinary telephones, intercoms, communication stations or telephone answering machines provided to enable voice communications between subscribers of the same communication network.

The telecommunication devices 2 also comprise, for example, data processing terminals and modems that can be connected to telephone lines to transmit data via the switch 1.

The telecommunication devices 2 further comprise, for example, telecopiers or terminals adapted to send and receive voice signals and data signals, such as certain, so-called directory terminals or certain sophisticated telephone sets, it being understood that the same switch is adapted to serve simultaneously different telecommunication devices 2 connected to it through the intermediary of lines generally referenced L.

In the conventional way, the switch 1 is adapted to be connected to other switches such as 1A and 1B by telephone wire or microwave links 3, of which the most conventional media are analog network lines, MIL or ISDN type digital links and automatic dedicated lines.

To this end the switch 1 comprises dedicated junctors responsible for connecting the lines L from the telecommunications devices 2 or the telephone links 3 to its own switching network 4.

In the schematic shown in FIG. 1 the dedicated junctors providing the interface with the telecommunication devices 2 are referenced 6 while those that provide the interface with the telephone connections 3 are referenced 7.

Each dedicated junctor 6 or 7 essentially comprises a connection interface 8 or 9 respectively connected to one or more telecommunication devices 2 or to one or more telephone links 3, the devices and links connected to the same interface being identical or mutually compatible.

Each connection interface 8 and 9 is respectively connected by the dedicated junctor of which it forms part to an access network 10 or 11 to the switching network 4 through the intermediary of an adapter arrangement 12 or 13 for the speech signals or data signals and a signalling collector arrangement 14 or 15. An identification arrangement 16 is also provided in each junctor 6 or 7 to enable it to be recognized by the central processor 5. The structure and the functions of the connection interfaces and the matching, signalling and identification measures will be specified later during this description.

The dedicated junctor access interfaces 10 and 11 are connected to the switching network 4 by two-way time-division multiplex links LM, such as LM0, LM1, LMn, LMm in FIG. 1. Each of these time-division multiplex links LM is, for example, a 2 048 kbit/s link able to carry 32 telephone channel per pair of wires on a two-way link using two pairs of wires.

In the embodiment proposed each time-division multiplex link LM serves four junctors 6 and 7 which also share the 32 time slots.

The distribution of the time-division channels depends, for example, on the geographical position of each junctor relative to the three other junctors with which it shares a time-division multiplex link LM in the unit that comprises them: in this instance, it is the individual position of each of four connectors provided on the backplane to connect four junctors to the same time-division multiplex link LM which determines the assignment of the time-division channels to each of the junctors, said connectors being made identical for the connection of all the junctors to the time-division multiplex links LM, in spite of the differences that exist between junctors.

Each time-division multiplex link LM is responsible for transmitting all of the information switched or to be switched by the switching network 4 and all of the signalling associated with this information for each of the junctors 6 and 7 that it serves, said information and said signalling sharing the time-division channels assigned to the junctor in question in each transmission direction.

The switching network 4 is made up of one or more switching matrices at which terminate the time-division multiplex links LM0 through LMn.

In the embodiment proposed the switching network 4 comprises an 8×8 type matrix enabling switching of the time-division channels of eight bidirectional time-division multiplex links LM, such as the M088 matrix manufactured by SGS.

In the known manner, such matrixes comprise a switching memory 17, often referred to as the speech memory, receiving the bytes successively provided by the time-division multiplex links LM via an input multiplexer 18 for each of the various time-division channels that these link comprise in a first, so-called incoming or inbound direction.

The various bytes received are retransmitted by the switching memory 17 in a predetermined order and via an output demultiplexer 19 on the time-division channels of a second, so-called outgoing or outbound direction of the multiplex links LM to the junctors 6 and 8 responsible for transmitting them further.

The byte output of the switching memory 17 is connected in parallel to the input of the output demultiplexer 19 and to the input of a communication interface 20 enabling the central processor 5 to read the bytes appearing at the output of the switching memory 17.

The communication interface 20 is connected to the input/output bus 21 of the central processor 5 which also connects this processor to the usual set of random-access and read-only memories 22.

The communication interface 20 is also connected to one input of a two-input multiplexer 23 located between the input of the demultiplexer 19 and the output of the switching memory 17 to which its second input is connected. The link established in this way between the central processor 5 and the multiplexer 23 enables the central processor 5 to substitute a byte defined according to its own requirements for a byte output from the switching memory in any outgoing time-division channel of any of the multiplex links LM.

In the conventional way, the switching memory 17 is controlled by a control memory 24 and a timebase 25 which together control the writing and reading of bytes into and out of this switching memory.

The timebase 25 receives a clock signal H and a synchronization signal SY from a central clock 26 of the switch which is external to the switching network 4.

By choosing a clock frequency greater than that required for writing and reading bytes into and out of the switching memory 17 it is possible to provide additional clock periods for carrying out operations not previously provided for.

Thus multiplying the clock frequency by a factor of 2 or more for writing and reading the switching memory 17 provides time for direct reading by the central processor 5 of the bytes placed in memory without disrupting the reading of the bytes sent on the outgoing time-division channels of the time-division multiplex links LM.

The control memory 24 is conventionally addressed in write mode by the central processor 5 via the communication interface 20 and a first address selector 27 and in read mode by the timebase 25 via this first address selector. The switching memory 17 is addressed in read and write modes by the control memory 24 or by the timebase 25 via a second address selector 28.

In the embodiment proposed the central processor 5 has at least one peripheral device 68 comprising a universal asynchronous receiver-transmitter circuit (UART or USART) adapted to send or receive for the central processor 5 and in digital form at least some information intended for or received from the junctors 6 and 7.

To this end the peripheral device 68, to be more precise each asynchronous receiver-transmitter circuit 29, is connected to the input-output bus 21 of the main processor 5 and to a time-division multiplex link LM, such as the link LMm, giving it access to the switching network 4 via an individual link circuit 30. Each link circuit 30 converts to PCM compatible bytes data emitted serially by the associated asynchronous receiver-transmitter circuit 29 with a view to transmission of these bytes on an incoming time-division channel of the time-division multiplex LM to a junctor via the switching network 4. Each link circuit 30 also handles the serial transmission to the associated asynchronous receiver-transmitter circuit 29 of bits contained in the bytes received from a junctor via an incoming time-division channel of the time-division multiplex link which serves it, the switching network 4 and an outgoing time-division channel of the time-division multiplex link LMn.

An identification device 16 associated with the link circuit 30 makes it possible to recognize the peripheral device 68 that comprises it.

In the embodiment shown, a time-division multiplex link LMn makes it possible to connect auxiliary equipment 31 of the switch 1 to the switching network 4 of the switch, for example for processing multifrequency signalling that may be received from certain junctors. Each auxiliary equipment 31, which preferably connects to the time-division multiplex interface LMn in the same way as a junctor 6 or 7, is provided to this end with an access interface 32 similar to the access interfaces 10 and 11 and which will be described in more detail later together with these.

The access interface 32 is connected to a signalling arrangement 33 adapted to receive and send signalling from or to the switch 1 and to a processing arrangement 34 adapted to convert the information received into information that can be exploited by the switch, if necessary, the information received being dialing information transmitted in multifrequency encoded form, for example.

The auxiliaries 32 each comprise an identification arrangement 16 so that they can be recognized by the central processor 5 in the same way as it recognizes the junctors 6 and 7.

In the example described where the auxiliary is a multifrequency signalling equipment, the processing arrangement 34 is of course connected to the signalling arrangement 33 in order to operate.

Figure 2:
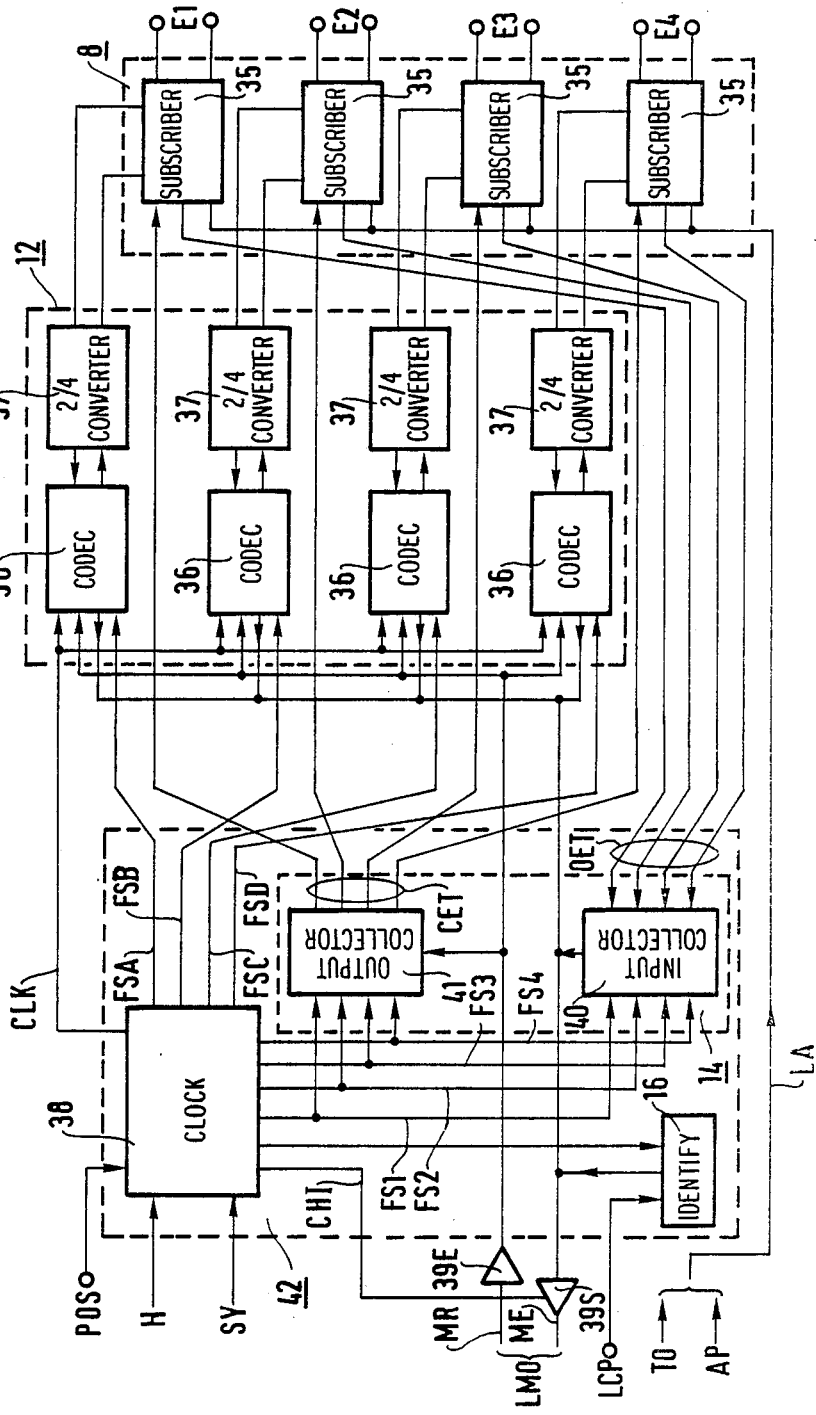
FIG. 2 shows one example of a junctor for telephone set type telecommunication devices.

The dedicated junctor shown in FIG. 2 is adapted to serve ordinary telephones (not shown) of which there are four in this instance individually connected by their line wires to terminals E1, E2, E3, E4 of four conventional subscriber line circuits 35 which constitute in this case the connection interface 8 of the junctor in question.

Each subscriber line circuit 35 is connected to a PCM coder-decoder or codec 36 via a two-wire/four-wire converter circuit 37 to enable the encoding in the form of PCM samples of analog signals that it receives from the telephone set that it serves and the conversion to analog form of voice signals conveyed to it by a succession of regularly spaced PCM samples.

Four codecs 36 and the four two-wire/four-wire converter circuits 37 respectively associated with them here form the adapter arrangement 12 of the junctor in question.

The four codecs 36 of the junctor, which are preferably of the cofidec type combining a filter with the coder-decoder proper, are connected in parallel to a two-way time-division multiplex link such as the link LM0 or to be more precise to each of the transmit one-way time-division multiplex links ME and receive time-division multiplex links MR of opposite directions of this link LM0.

The transmission of PCM samples by the codecs 36 during the channel time slots reserved to the junctor during frames on the one-way time-division multiplex link ME is controlled by a clock circuit 38 receiving clock signals H and synchronization signals SY from the clock 26 of the switch 1 as well as POS indications here consisting of a two-bit word enabling it to determine the positions of the channel time slots assigned to the junctor which comprises it.

As mentioned hereinabove, it is the geographical position of the junctor relative to the other three junctors with which it shares a time-division multiplex link such as the link LM0 which defines the position of the eight time slots which are allocated to it in each transmission during successive frames. This position is indicated, for example, by two bits and by wiring in the connector (not shown) connecting the junctor to the time-division multiplex link, wired on the backplane, for example. The clock circuit 38, which is usually a counter, will not be described further in that its construction is well known to those skilled in the art.

The clock circuit 38 controls over a link CHI an output amplifier 39S connecting the codecs 36 to the transmit link DX over which they send the PCM samples, in such a way that the junctor has a high-impedance state at its interface with said link ME during the frame time slots reserved for transmissions by the other junctors on this link.

The clock circuit 38 supplies the four codecs 36 under its control in the conventional way with the clock signals CLK at sampling frequency 8 kHz and with individual activation signals FSA, FSB, FSC and FSD for the frame time slot assigned to each of them.

The clock circuit 38 specifically provides timing indications enabling the cyclic sending of information identifying the junctor which comprises it on each transmission by the latter over the transmit link ME during different frames and the sending of signalling information by the signalling collector arrangement 14 of this junctor.

The identification information is supplied by the identification arrangement 16 of the junctor which is controlled by the clock circuit 38 and which drives the transmit link ME upstream of the output amplifier 39S in parallel with the codec 36.

The identification information is provided in coded form, for example in a byte denote "lcp" sent during the last of the eight time slots reserved to each of the four junctors during each frame on the transmit link ME.

In a preferred embodiment the "lcp" byte contained in the last of the eight time slots reserved to a junctor 6, 7, an auxiliary equipment 31 or a peripheral device 68 during a frame is systematically an identification byte.

The various types of junctor, auxiliary equipment and peripheral device each correspond to a different identification byte "lcp" which takes account of their type and their equipment level for those which are adapted to serve a variable number of terminals 2, this information being input to the junctor, possibly with other information, by an identification logic unit (not shown) which may be hardwired, for example, and via a set of links denoted lcp.

Similarly, an identification byte comprising only bits of the same value, for example, is generated by wiring for the junctor positions that are unoccupied on the transmit links ME.

As mentioned previously in relation to FIG. 1, each junctor 6 or 7 comprises a signalling collector arrangement 14 responsible for two-way transmission of signalling, possibly after adaptation, between the connection interfaces 8 and 9 and the central processor 5 via the switching network 4 in order to be exploited by the switch 1, that is to say between the subscriber line circuits 35 and the central processor 5, via the switching network 4, in the case of the junctor shown in FIG. 2.

To this end the signalling collector arrangement 14 of this junctor 2 comprises a multiplexer type input collector unit 40 receiving via dedicate links OET signalling which is in this instance provided in the form of changes of state by the telephone sets connected to terminals E1 through E4 of the subscriber line circuits 35 and translating these changes of state into binary data that can be transmitted on the time-division channels of the transmit link ME to which said input collector unit is collected.

The signalling collector arrangement 14 also comprises a demultiplexer type output collector unit 41 connected to the receive link MR downstream of an input amplifier 39E to receive the signalling sent in digital form by the central processor 5 via the switching network 4.

Activation of the input collector unit 40 in transmit mode and activation of the output collector unit 41 in receive mode are executed simultaneously by the clock circuit 38 which to this end provides activation signals FS1 through FS4 during the frame time slots concerned and bit transmit and receive clocks over links not shown here.

In a known way the output collector unit 41 converts the digital signalling information received from the central processor 5 into status indications that are transmitted to the subscriber line circuits 35 by dedicated links CET.

In a preferred embodiment the clock circuit 38, signalling collector arrangement 14 and identification arrangement 16 are integrated into the same circuit referred to as the analog terminal circuit 42.

Finally, in the embodiment shown in FIG. 2, the subscriber line circuits 35 received constantly and via a set of distribution links LD various auxiliary signals such as alternating current ringing signals AP and tone signals TO that they are able to transmit on command to the telephone sets that they serve.

Figure 3:
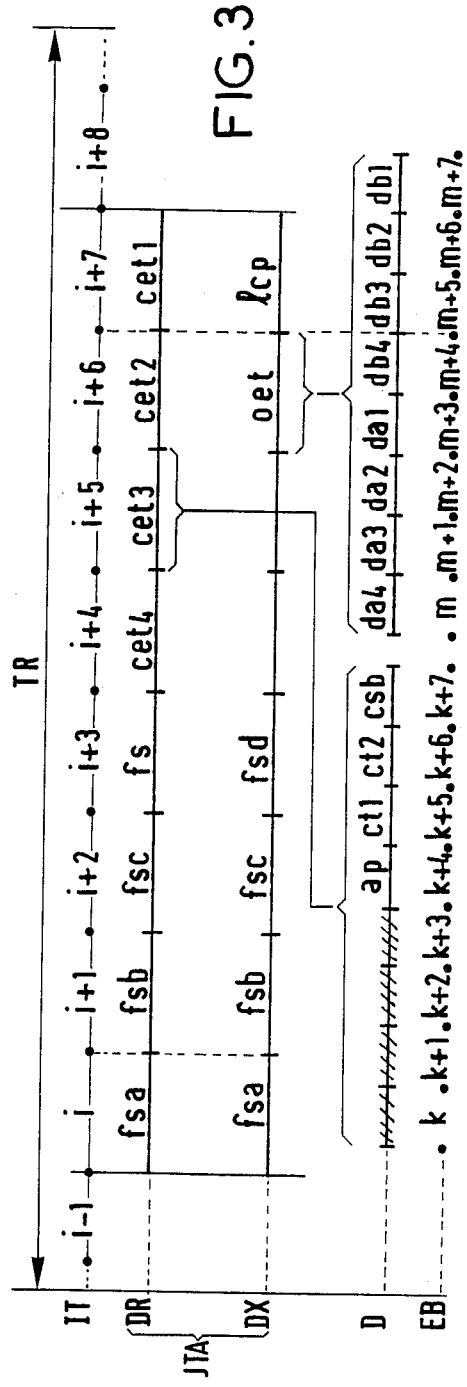
FIG. 3 is a diagram showing the composition of the time slot bytes for a junctor such as that shown in FIG. 2.

The functioning of the junctor shown in FIG. 3, in collaboration with the other parts of the switch as shown in FIG. 1, is described below with reference to the diagram in FIG. 3.

As already mentioned said junctor, dedicated to serving analog telephone sets, has eight time-division channels in each of the two transmission directions of the time-division multiplex link, in this instance the link LM0, to the wires of which the connector (not shown) to which it is connected are connected. Given that the same clock defines the channel time slots for each transmission direction, a conventional process is used to ensure that for the time-division channels of the same rank, and therefore corresponding to the same frame time slot in the two transmission directions on the time-division multiplex link, are assigned to the same junctor, such as the time-division channels corresponding to the time slots denoted "i" through "i+7" for a frame comprising 32 channel time slots in FIG. 3 in the opposite direction links MR and ME of the time-division multiplex link LM0.

In the embodiment described, each of the time slots denoted "i" through "i+3" corresponds to two time-division channels one transmitting in one direction over the transmit link ME and the other transmitting in the other direction over the receive link MR information exchanged between one of the stations connected by its line wires to the junctor and another station to which it is connected via said junctor and the switching network 4.

The distribution of the time-division channels denoted fsa, fsb, fsb or fsc to the stations connected to a junctor is preferably geographic and therefore depends on the respective positions of the terminals E1, E2, E3, E4 to which the line wires of the station in question are connected.

As indicated above it is the clock circuit 38 of the junctor which successively activates the codecs 36 in order to make each of them send a byte corresponding to a sample of the analog signal that it receives from a station via the subscriber line circuit 35 and the two-wire/four-wire converter circuit which serve it and to make each of them recover a sample received by the receive link MR during the time slot that is individually assigned to them in each frame and that the clock circuit indicates to them successively by means of individual activation signals FSA through FSD transmitted over the links similarly denoted in FIG. 2 and corresponding to the time-division channels fsa through fsd.

In the embodiment described, each of the time slots denoted "i+4" through "i+7" in the case of the junctor shown in FIG. 2 is assigned to transmission over the receive link MR of status commands "cet1" through "cet4" to the benefit of the four stations connected to the subscriber line circuits 35 of the junctor.

In the case of analog telephone sets these status commands are simple and few in number, comprising for example a command "ap" to send ringing signals, two commands "ct1" and "ct2" to send tones and a wait command "csb" each represented here by one bit. These commands "ap, ct1, ct2, csb" are grouped to form a half-byte which is sent in each frame on a time-division channel of the receive link MR assigned to the station concerned such as the time-division channel denoted "cet3" of the receive link MR which corresponds to the time slot "i+5" and which is assigned here to the third station or to be more precise to the third subscriber circuit 35 of the junctor 6 here described with reference to FIGS. 1 through 3.

In the selected example the status command half-byte occupies the four consecutive bit positions "k+4" through "k+7", the four positions "k" through "k+3" of the byte being filled in a non-meaningful way.

Such bytes "cet1" through "cet4" corresponding to the four time-division channels of rank "i+4" through "i+7" in the frame are received by the input collector unit 40 of the junctor activated in succession by the signals FS1 through FS4 from the clock circuit 40 which are transmitted by the similarly denoted links to this collector unit. This then sends in the form of changes of state on the link CET which connects it to the subscriber line circuits 35 on a junctor any command concerning the sets that these circuits individually serve.

In the opposite direction, and still with reference to junctors shown in FIG. 2, the time slots denoted "i+6" and "i+7" are assigned on the transmit link ME to the transmission of a junctor status observation byte "oet" (to be more precise, the status of the four stations connected to the terminals of these subscriber line circuits 35) and transmission of the "lcp" byte identifying the junctor and its level of equipment.

In the example chosen, the status observation byte "oet" combines on its eight bits "m" through "m+7" four observations da1 through da4 relating to the position of the grounding button provided on each of the four telephones connected to the junctor in question and four observations db1 through db4 relating to the loop status of each of these four telephones. To this end the subscriber line circuit 35 monitors in the conventional way any change of loop state or change of grounding state of the telephone connected to its terminals and indicates the appearance of any such change via the links OET to the output collector unit 40 of the junctor that comprises it. The latter modifies the binary value of the corresponding observation bit in the observation byte "oet" that it sends during the next frame on the transmit link ME.

As mentioned above it is the identification arrangement 16 activated by the clock circuit 38 which generates the identification byte "lcp", said identification arrangement 16 possibly acting in cooperation with the output collector unit 40 in one possible embodiment.

In practice, when an analog telephone set goes off-hook in the junctor 6 which serves it the binary value of the loop observation bit "db" ("db2", for example) is changed in the byte produced by this junctor 6 during the frame which follows the closing of the line loop representing the off-hook condition.

The byte "oct" transmitted by the transmit link ME of the time-division multiplex link LM0 is then written into the switching memory 17 of the switching network 4 (FIG. 1) at the address at which follow on from one another the bytes "oct" successively generated by the junctor 6 in question during consecutive frames. As mentioned, the clock frequency chosen enables the central processor 5 to read the switching memory 17 at the address at which are successively replaced one after the other the bytes "oct" sent during consecutive frames by the junctor 6 in question, each byte being transmitted in parallel to the central processor 5 via the interface 20 and the bus 21 for analysis.

Each analysis supervises simultaneously the four stations connected to the junctor in question.

The calling (off-hook) station is sent the dial tone by modifying the binary value of the tone sending command ("ct1", for example) of the bytes sent during the following frame in the time-division channel ("cet2", for example) used to send signalling to the subscriber line circuit serving the calling station for the junctor in question. The binary value of the tone sending commands is modified by the processor 5 via the interface 20. It writes the appropriate byte into the switching memory 17 at the address enabling subsequent sending of this byte over the time-division multiplex link LM0, to be more precise its receive link MR, during the following time slot "i+6", under the control of the control memory 24.

The output collector unit 41 of the junctor 6 concerned receives the tone sending command "ct1" in the time-division channel "ect2" concerned; this unit is activated during time slot "i+6" and causes an instruction to be sent to the subscriber line circuit 35 concerned via one of the links CET. The line circuit feeds to the station connected to its terminals E2 analog tone signals TO via the link LD concerned and through the intermediary of a switch that is not shown.

By means of the identification bytes "1ct" each junctor 6 signals to the processor 5 the type of dialing employed by the devices 2 and in particular the telephone stations connected to it.

In the case of loop-break dialing from a telephone it is through the intermediary of the loop observation bit "db" ("db2", for example) assigned to the subscriber line circuit concerned that the processor 5 receives via the switching memory 17 the successive loop opening and closing indications corresponding to the dialing. By changing the binary value of a given loop observation bit during successive frames, these indications are recovered in real time by the central processor 5 which from them makes the necessary inferences for setting up a path through the switching network 4 between the calling station and the station it is calling in order to establish two-way communication between them.

This entails memorizing two addresses in the control memory 24, one concerning the address in the switching memory 17 at which are written during successive frames the switched information bytes—samples of speech or data converted to analog form and encoded—emitted by the station and the other the address at which are written in the same switching memory the switched information bytes emitted by the other party, both these items of information passing through the adapter arrangement 12 of the junctor 6 (FIG. 1).

In the case of multifrequency code dialing from a station this specific feature is conferred on the central processor 5.

On recognizing a call from a station of this kind the processor 5 sets up a path through the switching network 4 between the subscriber line circuit 35 to which the station is connected in the junctor 6 and a multifrequency signalling receiver in the auxiliary equipment 31 slot in the switch 1.

In one embodiment each multifrequency receiver comprises four identical units (not shown) having the same general structure as the auxiliary equipment 31 shown in FIG. 1 and is adapted to be substituated for a junctor in a connector by virtue of the standardization of the links H, SY, POS, MR, ME and LCP.

Each of the possible four units of a multifrequency receiver comprises an individual time-division channel on the receive link MR of the multiplex link LM, such as the link LMn, to which the receiver is connected which enables simultaneous processing of multifrequency signalling bytes from four separate callers, the other four time-division channels reserved to the receiver not being used.

Two time-division channels are shared between the four units on the transmit time-division link ME for sending digits to the processor 5, these digits each being coded on four bits and successively obtained by converting the multifrequency code into binary code in the processing arrangement 34 of a unit, this arrangement being a known code converter as usually employed.

The multifrequency dialing signals transmitted over a time-division channel of the subscriber line circuit 35 of a calling station to a multifrequency receiver unit via the switching memory 17 are sent successively digit by digit to the processor 5 via the switching memory 17 and in the form of consecutive half-bytes on a time-division channel. They are here grouped with the half-bytes corresponding to another multifrequency receiver unit, active or inactive.

As previously, the processor 5 reads the switching memory 17 via the interface 20 at the address corresponding to the signalling that it is expecting, this combining in this instance two half-bytes relating to two different calls, one of which may be a dummy. It is at the level of the multiplexer 23 that a decision is taken under the control of the processor 5 to transfer or not the bytes leaving the switching memory 17 to the output demultiplexer 19 for transmission or not, the bytes intended specifically for the processor 5 obviously not being transmitted through this output multiplexer.

The processor 5 has direct access in the switching memory 17 to signalling information originating from the junctor 6 as mentioned hereinabove. The same applies to the signalling information originating from the junctor 7 serving the links connecting to other switches, where the links are of the analog network line type the junctors 7 then being in practice indistinguishable from the junctors 6, except that their connection interface 9 is specifically adapted for the exchange of change of state or multifrequency signalling specific to this type of line. Because of this the interface 9 and the junctor 7 comprising it are not further described in that they do not comprise any elements that are novel in relation to what is described here or in relation to the prior art.

As indicated hereinabove, all the information exchanged between junctors 6 or 7 and auxiliary equipments 31 passes through the switching memory 17 which serves also to transmit status commands that the processor 5 has just written into it for transmission to each.

Figure 4:
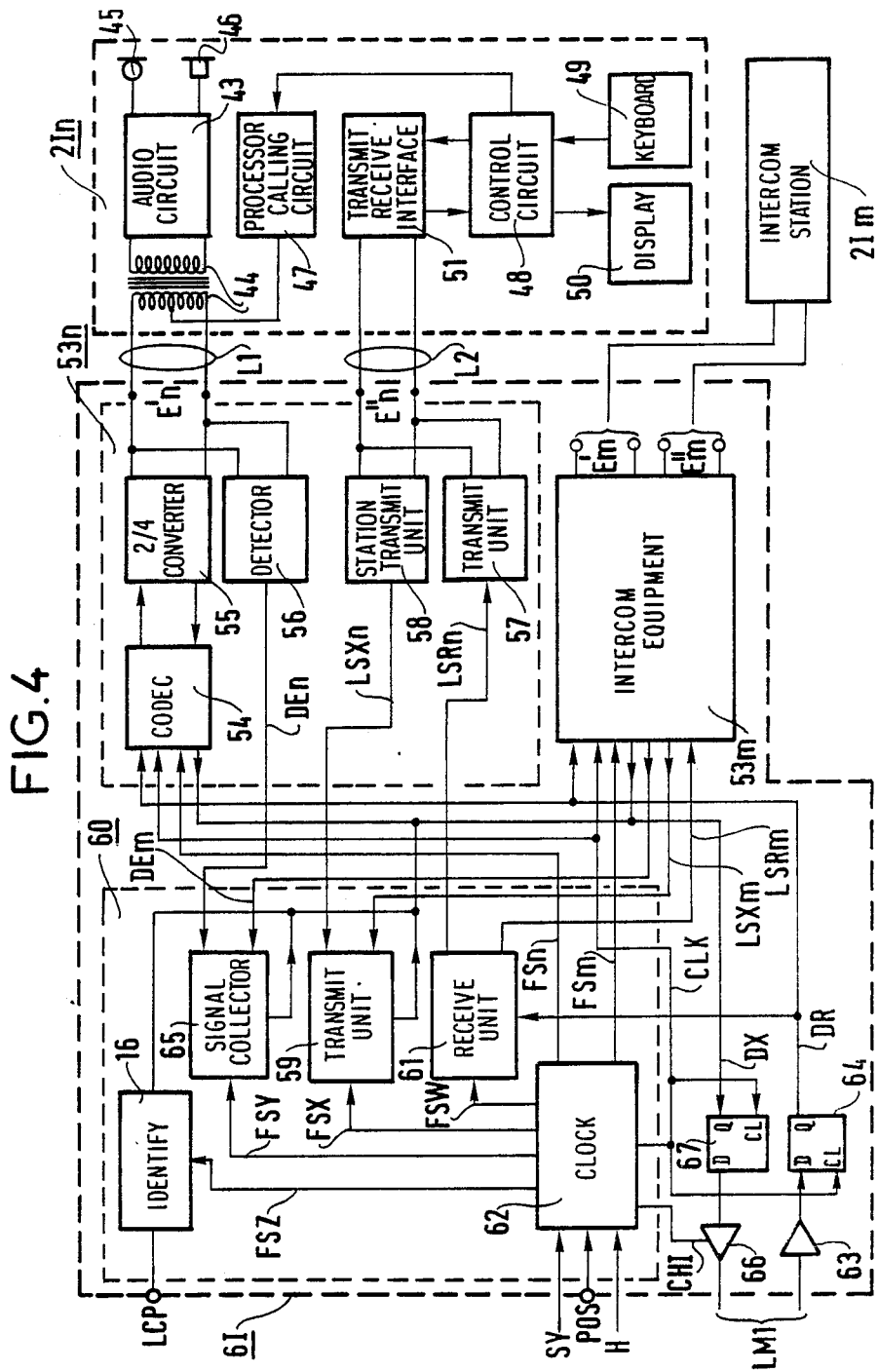
FIG. 4 shows another example of a junctor, in this case for two-line stations.

The junctor 6R shown in FIG. 4 is designed to serve telecommunication devices 2 for which data has to be exchanged in serial form between the switch 1 and the devices by a supplementary line in parallel with the usual telephone line, this being the case with intercom stations, for example, especially those with a display device, a station of this kind being schematically represented at 2In.

In the intercom station 2In a pair L2 of telephone wires for serial asynchronous transmission of data is associated with the pair L1 of telephone wires for transmitting switched signals constituting the calls passing through the switch 1.

To this end the station 2In comprises an audio circuit 43 connected by a transformer 44 to the line 21 and connecting to this line at least a microphone 45 and an earpiece 46, in the known way. This audio circuit receives in the classical way speech samples in analog form or possibly data transcoded so that it can be transmitted by the line in the same way as analog voice signals.

In the embodiment shown the primary of the transformer 44 to which the wires of the line L1 are connected can have a current signal DE applied to it through the intermediary of a current generator (not shown) of a circuit 47 which makes it possible to call the processor 5 of the switch 1 for the purposes of setting up or modifying a call.

The processor calling circuit 47 is controlled by the control unit 48 of the station 2In, conventionally based on a microprocessor with associated memories, this conventional structure not being further described here. The control unit 48 is conventionally interface to at least a keyboard 49 through which users operate the station 2In and possibly a display device 50 for communicating messages, usually alphanumeric messages, to users.

In the embodiment shown the control unit 48 calls the processor 5 of the switch by sending a current signal "de" over the line L1 through the intermediary of the calling circuit 47. The processor 5 responds to the control unit 48 of a calling intercom station 2I through the intermediary of the serial link consisting of the line L2 which is connected to a transmit-receive interface 51 converting to parallel form the data received serially via this line for transmission to the control unit 48, this interface carrying out the converse conversion for data sent by the control unit 48 to the processor 5.

In the embodiment shown the intercom station is supplied with power by the junctor 6I to which it is connected, via the line L2; to this end this line terminates at a power supply circuit (not shown) in parallel with the transmit-receive interface 51 in the station.

The junctor 6I to which the station 2In is connected can service a number of identical intercom stations such as 2In and 2Im in this case, the number of stations being here limited to four per intercom junctor 6I, each of these stations terminating at an individual intercom equipment 53, such as the equipments 53m and 53n.

Each intercom equipment such as 53n comprises a codec or cofidec 54 in series with a two-wire/four-wire converter circuit 55; the two terminals E'n of the latter are connected to line L1 which transmits the low-frequency analog signals of the calls and the current signal DE. A detector circuit 56 looks for appearance of the current signal DE when the latter is sent by the station 2In and to this end is connected to the two terminals E'n.

Remote power feed to the station 2In is provided by the intercom equipment 53 through a circuit (not shown) connected to the two terminals E'n; a conventional junctor protection circuit (not shown) protects the junctor against overvoltages that may arrive via lines L1 and L2.

Line L2 is also connected in parallel to a first transmitter circuit 57, in this instance a so-called junctor transmitter circuit, responsible for converting signals received from the processor 5 via the switching network 4 and a receive unit 61 into squarewave differential signals that can be transmitted by the line L2 to a second, so-called station transmitter circuit 58 adapted to convert the squarewave differential signals transmitted by the station via the line L2 into unipolar rectangular pulses.

The PCM compatible pulses output by the transmitter circuits 58 of the intercom equipments of an intercom junctor 6I are assembled in a transmitter unit 59 of a common integrated circuit 60 to which these transmitter circuits are connected by individual links LSX, such as the link LSXn.

The transmitter unit 59 samples signals received from the station transmitter circuits 58 and encodes them in the form of PCM compatible bytes and transmits said bytes during time slots "j+4" through "j+7" assigned to the junctor which comprises it.

The common circuit 60, which is similar to the terminal circuit 42, also comprises a receiver unit 61 connected by individual links LSR, such as the link LSRn, to the junctor transmitter circuits 57 forming part of the intercom junctor which comprises it, for recovering the bytes which appear during time slots "j+4" through "j+7" assigned to this junctor with a view to sending the information that they contain to the intercom stations after conversion.

The distribution of pulses by the receiver unit 61 is controlled by a clock circuit 62 similar to the clock circuit 38 and, like the latter, receiving the clock signal H and the synchronization signal Y together with the POS information which enables it to know which channel time slots are assigned to the intercom junctor which comprises it on the time-division multiplex link LM, such as the link LM1, to which this junctor is connected. The receiver unit 61 is connected to the receive one-way link DR of the link LM1 via an input amplifier 63 and a timing flip-flop 64 which is present but not shown in the terminal junctor shown in FIG. 2.

The transmission by the transmitter circuit 59 is controlled by the clock circuit 62 via a link FSX indicating to it the PCM compatible pulse transmission time slots for the various intercom equipments of the junctor, and likewise the receiver unit is controlled by the clock circuit 62 via a link FSW.

The output of the transmitter unit 59 is connected to the transmit one-way link DX of the time-division multiplex link LM1 in parallel with the codecs 54 of the intercom equipments of the junctor, the identification arrangement 16 of this junctor and a call signal collector circuit 65 receiving call indications originating from the extractor circuits 56 of the junctor. An output amplifier 66 connected to the output of a timing flip-flop 67 receives the PCM or PCM compatible signals respectively sent by the codecs 54 of the intercom equipments of the junctor and the identification arrangement, the calling signal collector circuit and the transmitter unit; it transmits them over the transmit one-way link of the time-division multiplex link LM1 to the switching network 4 in the absence of any command to place its output in the high-impedance state, received from the clock circuit 62 via the link CHI when said link is temporally assigned to another junctor.

The identification arrangement 16 and the calling signal collector circuit 65 are selectively activated under the control of the clock circuit 62 via the links FSZ and FSY, the first of these receiving an identification information "lcp" coded by hardwiring and supplied over the link lcp, which here comprises four wires corresponding to four information bits and specifying the type of junctor and its equipment level.

Figure 5:
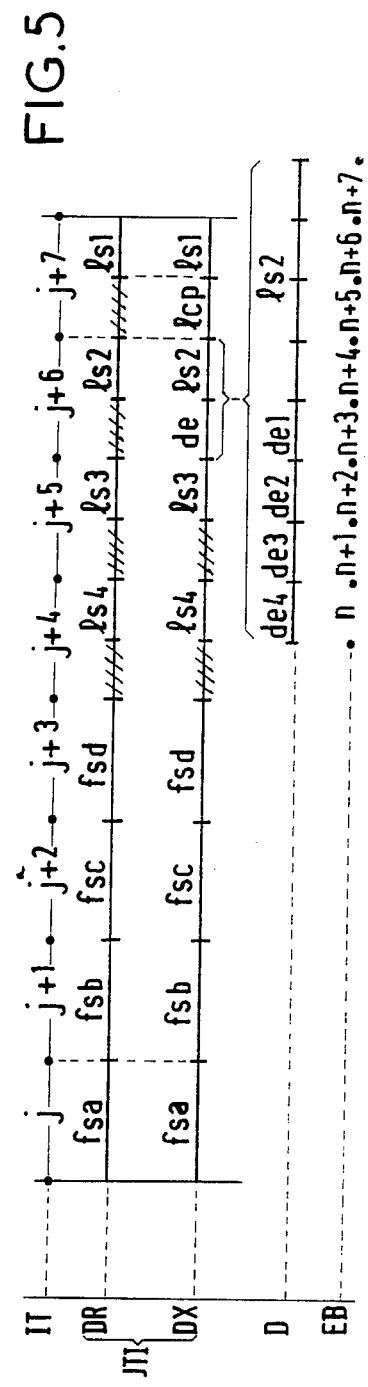
FIG. 5 is a diagram showing the composition of the time slot bytes for a junctor such as is shown in FIG. 4.

FIG. 5 is used to explain the functioning of an intercom junctor such as the junctor 6I in collaboration with the other parts of the switch, this junctor being permanently assigned eight time-division channels on the time-division multiplex link LM1 which connects it to the switching network 4 of the switch 1 that comprises it.

These eight time-division channels correspond to the eight time slots denoted "j" through "j+7" in FIG. 5. Each of the time slots denoted "j" through "j+3" corresponds to two time-division channels of opposite directions reserved to the bytes "fsa" through "fsd" passing through tee codecs 54 of the intercom equipments 53 of the junctor in question, each of these time slots being assigned to a different codec, for example, according to the position in the junctor of the intercom equipment comprising this codec.

The bytes "fsa" through "fsd" correspond to PCM encoded audio samples or data converted to a form enabling them to be PCM encoded.

The time slots denoted "j+4" through "j+7" are shared on the transmit link DX and on the receive link DR.

The time-division channel corresponding to the last time slot "j+7" on the transmit link DX is divided into two half-channels the first of which is reserved for transmission of an identification half-byte comprising the four identification bits "lcp" and the second of which is reserved for transmission of the half-bytes "1s1" corresponding to digital data transmitted by one of the transmit circuits 58 of the junctor.

In a similar way, the time-division channel corresponding to the time slot "j+7" on the receive time-division link DR is divided into two half-channels of which the second is reserved for reception of the half-bytes "1s1" corresponding to digital data transmitted to the receive circuit 57 forming part of the same intercom equipment as the transmitter circuit 58 considered above.

Likewise in a similar manner, the second half-channels of the time-division channels corresponding to the time slots "j+4" through "j+6" are assigned to the half-bytes "1s4, 1s3, 1s2" corresponding to digital data transmitted either by the station transmitter circuits 58 or by the junctor transmitter circuits 57 of the possible further three intercom equipments 53 of the junctor 6I.

The first half-channel of the time-division channel corresponding to the time slot "j+6" on the transmit channel is reserved to a half-byte "de" originating from the extractor circuit 56 of the junctor, the four bits denoted "n" through "n+1" of this half-byte each representing the present status of the current signal DE from one of the intercom stations 2I connected to the junctor 6I.

In the embodiment shown the control unit 48 of each intercom station 2I is operative on the calling circuit 47 which comprises it to request communication with the processor 5 of the switch 1.

This request is submitted by modifying the binary state of the bit, such as the bit "del", assigned to the intercom equipment serving the station from which the request emanates in the half-byte "de" sent over the transmit link DX during the time slot "j+6" which follows detection of this modification by the detector circuit 56 of the junctor concerned.

This half-byte "de" is written into the switching memory 17 at the address corresponding to the time-division channel which transmits it and is therefore available to the processor 5 which, as already explained, has direct memory access in read mode to the switching memory.

Thus the processor 5 is able to recognize simultaneously access requests from the intercom stations 2I served by the same junctor 6I within a maximum time-delay equal to the duration of a frame.

On receiving a request for access by an intercom station 2I the processor 5 establishes a path between the intercom equipment 53 serving this station and one of the universal asynchronous receiver-transmitter circuits 29 available to it via the link circuit 30 serving this receiver-transmitter circuit, the time-division link LMm to which the link circuit is connected, the switching network 4 and the time-division multiplex link LM1 connected to the intercom equipment in question.

The control unit 48 sends the digital data from the intercom station 2I concerned that it wishes to transmit in the form of a message consisting in this instance of a sequence made up of one bit, called the start bit, which is always the same, eight bits corresponding to the data to be transmitted, a parity bit and two end of message bits at a speed corresponding, for example, to 9 600 bauds.

The message received at the station transmitter circuit 58 is converted and then transmitted to the transmitter unit 59 which samples it in order to transmit it via a channel which corresponds to a time-division half-channel and which therefore has a data rate of 32 kbit/s.

The bytes corresponding to the converted message and each comprising a message half-byte associated with a meaningless half-byte are sent during consecutive frames, for example four frames per message.

The successive bytes corresponding to the same message, a signalling message, for example, are successively transmitted via the switching network 4 to the link circuit 30 chosen for them by the processor 5.

The link circuit 30 reconstitutes the message by an operation which is the converse of that carried out by the transmitter unit 59 and is carried out under the control of the clock 26; it also eliminates the start bit, the two end bits and also the parity bit after checking the latter. Messages are transmitted to the processor 5 byte by byte.

In the opposite direction transmissions from the processor 5 to an intercom station 2I are sent via the bus 21 to a universal asynchronous receiver-transmitter circuit 29 which receives them in parallel form and constructs a serial data stream addressed to the link circuit 30 to which said receiver-transmitter circuit is connected.

The link circuit 30 forms messages having exactly the same composition as those sent by the transmitter units 59 and samples these messages in order to transmit them in the form of successive bytes through the intermediary of a time-division channel, each byte comprising a data half-byte and a meaningless half-byte.

The processor 5 first sets up a path between the link circuit 30 concerned and the receiver unit 61 of the intercom junctor 6I concerned via the time-division multiplex LMm, the switching network 4 and the time-division multiplex link LM1 in the example being described.

The link circuit 30 reconstitutes the message from the bytes received under the control of the clock circuit 62 of the junctor.

The reconstituted message is then transmitted to the junctor transmitter circuit 57 which converts it so that it can be transmitted in the form of differential signals via the line L1 to the intercom station 2I concerned. In the latter the message transmitted in the form of differential signals is again converted into unipolar binary pulse form by the transmit-receive interface. The messages received by an intercom station 2I are decrypted by the processor of the control unit 48 of the station which eliminates the start, end and parity bits after using them, retaining only the data actually originating from the processor 5, either for personal exploitation or for transmission to the destination unit, for example the display unit 50.

It is to be understood that other junctors 6 and 7 and various auxiliary equipments 31 may be associated with the junctors and equipments described above in the switch 1 proposed, adapted in each case on the basis of the processes and resources proposed herein.

We claim:

1. A system of connecting telephone subscribers based on a digital time-division multiplex switch (1) which is controlled by a central processor (5) and is synchronized by a central clock (26), wherein said switch comprises a switching network (4) comprising a time-division switching memory (17) and junctors (6,7) connected to the switching network by time-division multiplex links (LMO through LMn) and either to telecommunication devices (2) by which the subscribers are connected to the switch via appropriate lines (L) to communicate with each other, or to other switches (1A, 1B), these junctors being specifically adapted according to the telecommunications devices (2) or switch equipment (1A, 1B) to which they are connected and said system being characterized in that the various junctors are connected to the switching network in the same way, each having the same number of time-division channels on one of the time-division multiplex links carrying all of the information concerning it in such a way that this information is systematically switched to another junctor or to the central processor (5), said central processor having direct access to the switching memory (17) which it can read and write directly, and said central processor further having at least one access via a universal asynchronous receiver-transmitter circuit (29) connected in the same way as a junctor to a time-division multiplex link (LMn) via a link circuit (30) handling bidirectional conversion and transmission of signals between the time-division multiplex link and the universal asynchronous receiver-transmitter circuit concerned.

2. A subscriber connection system according to claim 1, characterized in that the time-division channels assigned to a junctor on the time-division link which connects it to the switching network (4) are fixedly distributed in each transmission direction at the rate of one time division channel per telecommunication device (2) assigned to the junctor for voice signal, data of signalling type information to be exchanged via the switching network (4) with at least one other junctor in the framework of calls and at the rate of at least one partial time-division channel per device for signalling type information to be exchanged with the central processor (5), and in that a time division channel in the sequence of time-division channels assigned to each junctor is assigned, at least in part, to transmission during each frame by this junctor of identification information to the central processor enabling the latter to find out the type and equipment level of the junctor.

3. A subscriber connection system according to claim 2, characterized in that requests (de, da, db) from telecommunication device (2) connected the same junctor and addressed to the central processor (5) are grouped in the same time-division channel on fixed assignment so as to be simultaneously transmitted by the junctor and simultaneously recognized by the central processor.

4. A subscriber connection system according to claim 2, wherein the junctors (6) to which the telecommunications devices (2) are connected comprise coders-decoders (36, 54) associated with two-wire/four-wire converter circuits (37, 55) for converting into PCM signal form voice, data or signalling signals sent in low-frequency analog form by the telecommunications devices (2) for the purpose of their communication from a junctor and also the reverse conversion of PCM signals into analog signals to the stations, characterized in that the junctors further comprise two common collector units (40, 59, 41, 6I), one per transmission direction, for signalling exchanged between the telecommunication devices and the central processor, said collector units handling transmission and reception in the time-division channels concerned of said signalling exchanged with the central processor, said signalling being generated either by the central processor or by the telecommunications devices (2) themselves and being only converted by the junctors.

5. A subscriber connection system according to claim 2, characterized in that signalling between at least certain telecommunication devices (2I) and the central processor (5) is exchanged via the switching network in the form of messages each comprising at least one start bit and two end bits surrounding the signalling information to be transmitted, characterized in that said messages are respectively sampled at the output of the universal asynchronous receiver-transmitter circuit (29) coupled to an output of the central processor (5) and in the junctor (6I) to which said telecommunication devices (2I) are connected in order to be transmitted via the switching network (4) in the form of bytes compatible with the PCM bytes, the transmission speed of said messages depending on the telecommunication devices (2I) and the lines connecting these devices to their junctor (6I).

6. A subscriber connection system according to claim 5, wherein at least certain telecommunication devices (2I) exchange signalling in the form of messages with the central processor via the switching network and where these devices (2I) each comprise a microprocessor based control unit (48), characterized in that the messages are constituted and received at the devices (2I) by the microprocessor of each control unit (48) operating as a universal asynchronous receiver-transmitter circuit and at the central processor via at least one shared universal asynchronous receiver-transmitter circuit (29).

7. A subscriber connection system according to claim 2, with telecommunication devices (2I) each connected to a junctor (6I) by two telephone lines enabling simultaneous transmission of voice and/or data signals to be switched on one line and signalling in the form of digital data on the other, characterized in that the time-division channels assigned to the junctor (6I) on the time-division multiplex link (LM1) which connects it to the switching network (4) are fixedly distributed in each transmission direction at the rate of one complete time division channel per telecommunication device (2I) assigned to the junctor for the voice, data or signalling type signals to be exchanged via the switching network (4) with at least one other junctor in the framework of communications as well as one incomplete time-division channel per telecommunication device (2I) assigned to the junctor for signalling exchanged in the form of digital data with the central processor (5), part of two time-division channels incompletely used for a telecommunication device being reserved to each frame, one for requests ("de") from said telecommunication device to the central processor (5) and the other for sending junctor identification information to the central processor.

8. A subscriber connection system according to claim 4, characterized in that the telecommunication devices (2I) are connected to a junctor (6I) by two-wire telephone lines of the intercom station type in particular, and are each connected by a first of these lines on the one hand to an individual coder-decoder (54) of the junctor for transmission of voice or data or signalling signals in low-frequency analog form and on the other hand to a current detector circuit (57) signalling the requests ("de") from said device addressed to the central processor (5) and by the second of these lines on the one hand to a remote power feed circuit and on the other hand to the time-division multiplex link (LM1) serving the junctor via two common collector units (59, 6I) and two transmitter circuits (57, 58) assigned to the devices in the junctor and respectively handling the conversion into unipolar pulse signals of the differential signals sent as signalling by the station and the inverse conversion for the other transmission direction.

9. A subscriber connection system according to claim 1, characterized in that the number of time-division channels reserved to a junctor on a particular time-division multiplex link that connects it to the switching network is sub-multiple of the total number of time-division channels provided by said particular link, the position of the time-division channels assigned to a particular junctor on said particular time-division multiplex link depending on the geographic position of said particular junctor relative to the other junctors with which it shares said particular time-division multiplex link.

* * * * *